Sept. 2, 1969 R. S. ANDERSON 3,465,357

AUTOMATIC SELF-LOAD COMPENSATING VARIABLE SPEED TRANSMISSION

Filed Aug. 26, 1968 2 Sheets-Sheet 1

INVENTOR.
RICHARD S. ANDERSON

AUTOMATIC SELF-LOAD COMPENSATING VARIABLE SPEED TRANSMISSION

Filed Aug. 26, 1968 2 Sheets-Sheet 2

INVENTOR.
RICHARD S. ANDERSON 3,465,357

AUTOMATIC SELF-LOAD COMPENSATING VARIABLE SPEED TRANSMISSION

Richard S. Anderson, 6260 S. Jamestown, Tulsa, Okla. 74135

Filed Aug. 26, 1968, Ser. No. 755,330
Int. Cl. G11b *15/32*
U.S. Cl. 242—191 9 Claims

ABSTRACT OF THE DISCLOSURE

A transmission used to transfer torque between two reels having tape coiled on each reel such as used in tape transports. Different size pulleys are coupled to each reel such that the smaller pulley attempts to drive the other pulley faster than necessary. The over-driving results in an increased stretching of the elastic belt on one side of the pulleys and a decreased tension on the other side of the pulleys. This unbalance of tensions results in a torque applied to both reels which maintains tape tension.

BACKGROUND OF THE INVENTION

Field of the invention

The present invention relates to a tape transport which includes a tape tension system for takeup and supply reels and operates with a single motor to drive the tape. In simultaneous winding and unwinding of magnetic tape during recording or playback, it is necessary and conventional to provide a driving motor to draw magnetic tape from a supply reel and permit it to be wound on a pickup reel. It is equally necessary in such an arrangement to provide a constant linear velocity upon both the supply and the pickup reels and then to constantly vary the angular velocity as the diameter of the tape progressively changes. In the conventional present state of the art tape transports, there are a number of conventional systems which use one or more driving motors to rotate takeup and supply reels to constantly generate a tension upon these reels and thereby prevent flutter or spillage of the tape once the driving motor pulls tape from the supply reel. This conventional prior art tape transport has disadvantages in the great number of parts used which affect the reliability of the entire tape transport system.

Description of the prior art

In many conventional prior art transports, it was necessary to provide a driving motor to operate a capstan and a pinch roller system. This type of drive normally includes a high-speed motor coupled to a speed-reducing device which drives a capstan and pinch roller combination that engages the magnetic tape. The pinch roller and capstan create some difficulty by the frictional engagement between the two and equally added a margin of wearable components that affected the reliability of the entire system.

SUMMARY OF THE INVENTION

The present invention servies to eliminate many of the disadvantages of prior art tape transports by providing a tape tension system whereby the rotation of the supply reel, caused by the magnetic tape being pulled from such reel by a motor driven device is transferred to a takeup reel and coils the tape. This system serves to apply tension to the tape in both the supply and pickup reels with the power on or with the power removed, and serves to operate on a mechanical rather than an electrical mode.

In brief, the present invention provides a tape transport system using a single source of rotating power which includes a pair of reels alternately serving as a supply reel and takeup reel with a web in the form of a tape coiled around each reel. The reels are spaced apart from each other and each has a rotating axis parallel to each other. A motor-driven means engages the tape and is disposed between the two reels and is capable of pulling tape from one of the reels towards the other reel. A means for transmitting motion in a first direction is coupled to the reels and a second means for transmitting motion in a second direction is also coupled to the reels. In a preferred embodiment of this invention these motion-transmitting means are in the form of a differential pulley arrangement whereby rotation of the supply reel is transmitted to the takeup reel by an endless belt which couples the two differential pulleys together. Thus, as the tape is being drawn from the supply reel, this rotation is transmitted to the takeup reel. By making the diameter of the pulley on the takeup reels smaller than the pulley on the supply reel, this smaller pulley tends to rotate faster than the larger pulley and thus provides a constant tension be placed upon the takeup reel and thus prevent spillage of the tape as the system is operated.

To provide automatic bilateral operation, two differential pairs of pulleys are provided coupled by means of two mono-directional clutches. In this manner, the clutching selects the appropriate differential pulleys thus providing tension in either direction.

Various other subsidiary objects and advantages of the present invention will be apparent to those skilled in the art from the following description of a single preferred embodiment. No limitation is intended by means of the following description, but instead reference is made to the appended claims for a precise definition of the true scope of the present invention.

The term "tape" as used in this specification means all equivalent devices such as wire, webs, ribbon, band, and the like.

A BRIEF DESCRIPTION OF THE INVENTION

DETAILED DESCRIPTION

Figure 1:
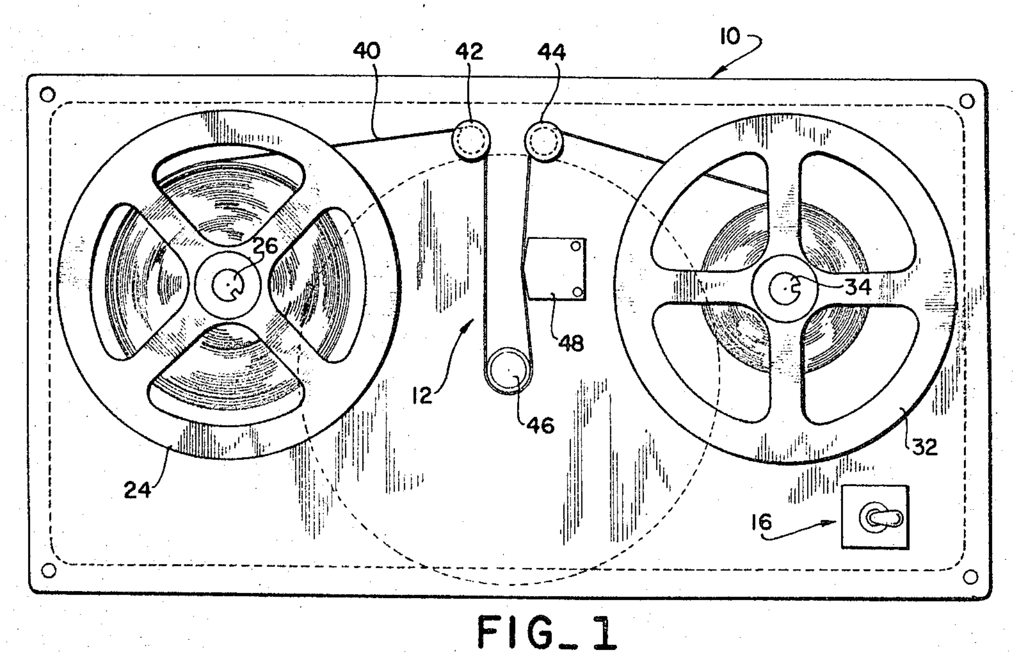
FIG. 1 is a plan view of the tape transport constructed in accordance with the present invention.
Figure 2:
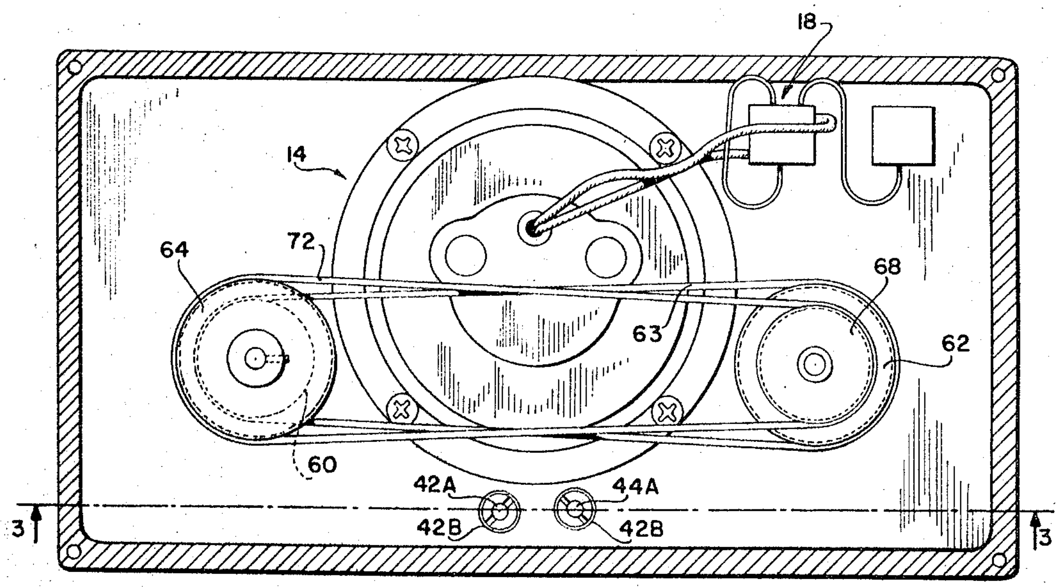
FIG. 2 is a bottom view, taken along lines 2—2 of FIG. 3 of the tape transport illustrated in FIG. 1.

Referring now to the drawings, and particularly to FIGS. 1 and 2, the preferred embodiment of a tape transport of the present invention is shown as comprising a compartmented case or housing 10 containing a tape deck 12, a driving means 14, being controlled by a switching mechanism generally designated 16 and a reversing switch, 18.

Housing 10 may suitably comprise a molded plastic box or a metallic rectangular container 20 and having a fitted top 22 that is rigidly retained in place on the container 20 by a plurality of conventional fasteners (not shown).

A supply reel 24 is mounted upon a shaft 26 which extends through the top 22 and extends into a bearing support 28 which is fixedly secured to the top 22 by a pair of conventional mechanical fasteners such as screws 30. A takeup reel 32 is mounted in a position spaced apart from the supply reel 24 and is fixedly secured on a shaft 34 that extends through the top 22 and is supported by a bearing 36 that is rigidly secured to the underside of the top 22 by a plurality of screws 38. While the reels 24 and 26 are respectively identified as supply and takeup reels for convenience and upon reversal of the switching mechanism 16, the reels would reverse and would alternately serve as supply and takeup reels. A web in the form of a conventional magnetic tape 40 is coiled in a looped fashion on the supply reel 24 and is also upon the takeup reel 32. The tape 40 extends around a pair of idler pulleys 42 and 44 which extend upwardly from the top 22. Each of the idler pulleys 42 and 44 are so shaped as to cause the tape 40 to nest therein as best illustrated in FIG. 1. Idler pulleys 42, 44 include a respective shaft 42A, 44A which extends through the top 22 and is secured thereon by a respective conventional nut 42B, 44B. A cylindrically shaped capstan 46 extends through the top 22 and is aligned between the idler pulleys 42 and 44 and is spaced apart from them so as to require the tape 40 to change direction approximately 90° around the first idler pulley 42 and to be wrapped approximately 180° around the capstan before it changes direction approximately 90° around the second idler pulley 44 thence to be coiled around the takeup reel 32. A conventional reading head 48 is rigidly mounted upon the top 22 and is disposed between the capstan 46 and the idler pulley 44 in a position so as to cause the tape 40 to slightly change direction as it rides past the recording head and thereby be in constant frictional engagement therewith.

The capstan 46 is mounted upon a capstan shaft 50 which extends outwardly of the driving means 14 in the form of a conventional motor 52. While a capstan is illustrated in the present embodiment of the present invention, other tape driving means may be substituted without departing from the invention. In the preferred embodiment, the motor 52 is a printed circuit-type pancake DC motor and serves to rotate the capstan shaft 50 at a low angular velocity in the order of 100 r.p.m. This type of motor is expected to give a maintenance-free unattended motor life in excess of 50,000 hours since the brush life is rated at $10^9$ revolutions. It is a feature of the present invention to have a low angular velocity motor directly driving the capstan 46 which eliminates the use of conventional pucks or pinch rollers that have an effect upon the reliability and maintainability of the tape transport.

The motor speed control, not shown, includes an electrical system which is of a conventional variety and may be accomplished by means of phase-lock servo drive system utilizing an electro-optical tachometer feedback element. This system is not part of the present invention and other similar speed controls may be equally applicable and are within the state of the art. This type of system as proposed provides exact speed control regardless of static or dynamic torque loading within the rating of the motor. A unijunctional transistor free running multi-vibrator (not shown) would provide a reference frequency to which the tachometer output pulse rate is locked. A triggered bi-stable multi-vibrator drives the motor directly with a train of constant amplitude variable width pulses which are integrated by the inertia of the motor system to provide a constant speed drive. A transistor switch is used to supply battery voltage from a source of power (not shown) to the armature of the motor 52. Other alternate systems to control the motor may be utilized in conjunction with the present invention.

Figure 3:
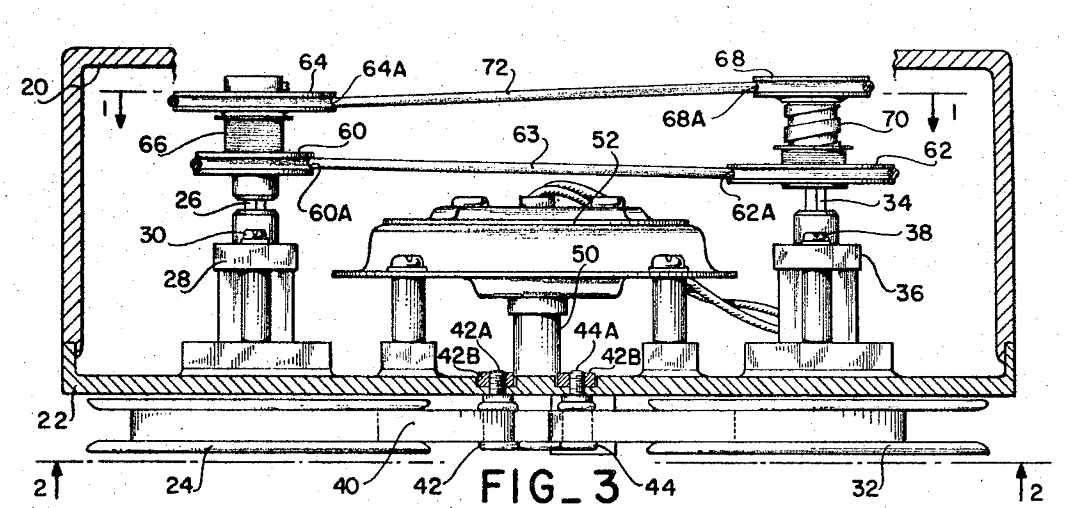
FIG. 3 is a cross sectional view taken along lines 3—3 of FIG. 2 and illustrates a tape tension system constructed in accordance with the present invention.

Referring now to FIGS. 1, 2, and 3, a means for transferring torque from the supply reel 22 to the takeup reel 26 is disposed in a form of a first pair of differential pulleys that includes a first smaller pulley 60 which is rigidly secured to the first driving shaft 26 and includes a semi-circular groove 60A formed on its outer periphery. A second larger pulley 62 having a semi-circular groove 62A formed on its outer periphery is rigidly secured to the second shaft 34 and a first endless elastic belt 63 in the form of a coil spring transmits torque from one pulley to the other. The arrangement of the driving pulleys 60 and 62 is such that the larger pulley 62 drives the smaller pulley 60 and in doing so the smaller pulley 60 attempts to rotate faster than the larger pulley but since the two reels 24 and 26 are coupled together by the tape 40, a tension equilibrium is set up and thereby a constant torque is placed upon both reels 24 and 26 and more importantly tension is placed on the tape 40. It is a feature of the present invention that this tension prevents tape spillage in the power on or power off conditions.

The magnitude of the resultant torque depends upon the degree of overdriving which is a function of the tape load on each reel. A calculation of the torque and resulting tape tension versus tape load is given below.

Definitions $R_{p1}$=radius of supply reel pulley
$R_{p2}$=radius of takeup reel pulley
$L_1$=length of belt moving toward takeup reel
$L_2$=length of belt moving toward supply reel
$X_0$=initial stress in belt
$X$=stress in $L_1$ (in./in.)
$Y$= stress in $L_2$ (in./in.)
$K$=spring constant of belt
$V_1$=velocity of belt length $L_1$ (in./sec.)
$V_2$=velocity of belt length $L_2$ (in./sec.)
$L_0$=unstretched length of $L_1$ or $L_2$ The unstretched length of $L_1$ and $L_2$ may be written as:

$$L_{01}=\frac{L_1}{1+X} \quad (1)$$

$$L_{02}=\frac{L_2}{1+Y} \quad (2)$$

Since the belt does not slip around either pulley the quantity of belt moved per unit time must be equal and the following equation may be written:

$$\frac{L_1}{1+X}V_1=\frac{L_2}{1+Y}V_2 \quad (3)$$

The total quantity of belt is constant so the following equation may be written:

$$\frac{L_1+L_2}{1+X_0}=\frac{L_1}{1+X}+\frac{L_2}{1+Y} \quad (4)$$

Simultaneous solution of Equations 3 and 4 for X and Y yield $$X=\left[\left(\frac{V_2+V_1}{V_2}\right)\left(\frac{L_1}{L_1+L_2}\right)(1+X_0)-1\right] \quad (5)$$

$$Y=\left[\left(\frac{V_2+V_1}{V_1}\right)\left(\frac{L_2}{L_1+L_2}\right)(1+X_0)-1\right] \quad (6)$$

The torque to either reel may be written as (7)

$$T=(Y-X)KR_p \qquad R_p=R_{p1} \text{ or } R_{p2}$$
$$=\frac{V_2+V_1}{L_1+L_2}\left(\frac{L_2}{V_1}-\frac{L_1}{V_2}\right)KR_p(1+X_0)$$

Since $L_1=L_2$ this may be simplified to:

(8)

$$T=\frac{1}{2}\,\frac{V_2^2-V_1^2}{V_1V_2}KR_p(1+X_0)=\left(\frac{V_2}{V_1}-\frac{V_1}{V_2}\right)(1+X_0)KR_p$$

Note: $V_1=R_2\omega_2=<V_2$

Steady state tape tension may be calculated using Equation 8 and the formula

Tape Tension$=T/R_t$ $R_t$=radius of tape stack on reel.

A second set of differential pulleys are mounted upon the respective shafts 26 and 34 and take the form of a second larger pulley 64 having a semi-circular groove 64A and is coupled to the smaller pulley 62 by a first mono-directional spring clutch 66 which is secured to the respective pulleys 60 and 64. As best shown in FIG.

4, the power transmitted through the clutch 66 is only effective upon the larger pulley 64 when rotated in a clockwise direction, and conversely, when the shaft 26 is rotated in a counterclockwise direction such as when the switch mechanism 16 reverses rotation of the capstan 46 and the reels 24 and 32. While the shaft 26 will rotate in the opposite direction, the torque transmitted to the pulley 60 will not be transmitted through the clutch since it only operates in a clockwise direction.

Figure 4:
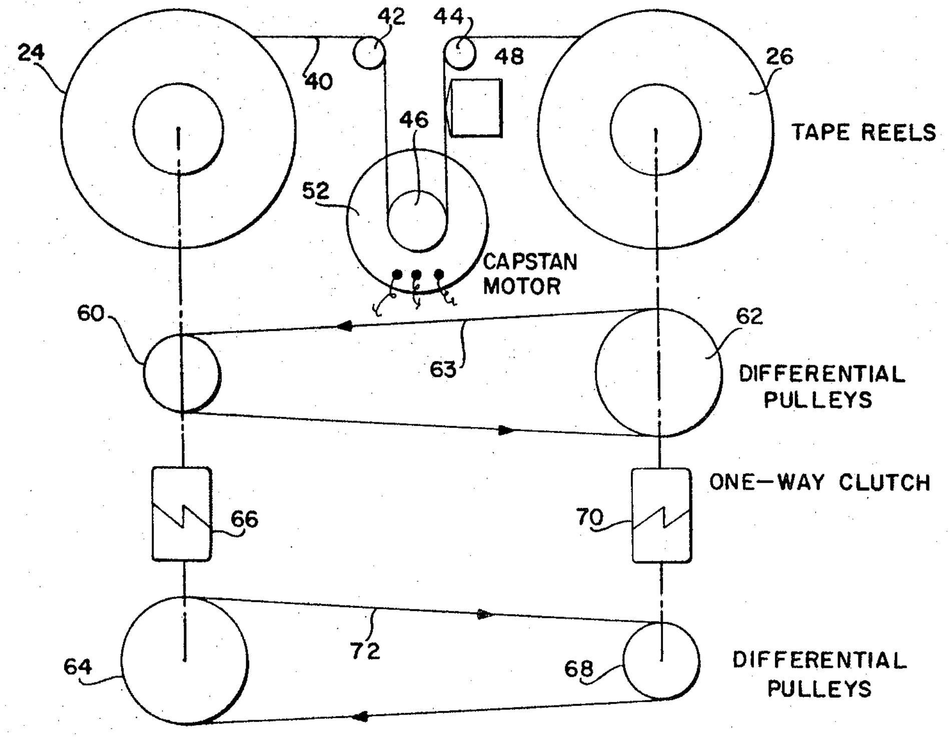
FIG. 4 is a schematic view showing the essential elements of a tape transport including a tape tensioning system constructed in accordance with the present invention.

A second smaller pulley 68 having an outer peripheral semicircular groove 68A is coupled to the larger pulley 62 through a second mono-directional spring clutch 70 which is operable only in the counterclockwise direction as best shown in FIG. 4. Thus, the pulley 68 is driven by the pulley 64 when power is transmitted through the first mono-directional clutch 66 and a resilient endless belt 72 couples the pulleys 64 and 68 together so thereby when the larger pulley 64 is coupled to the smaller pulley 60 upon rotation of the shaft 26 and the reel 24, in the counterclockwise direction. Power is transmitted through the belt 72 to the smaller pulley 68 thereby generating a tension equilibrium which is substantially identical but opposite in direction to that established upon rotation of the first differential pulleys 60 and 62.

Although in the embodiment shown, the supply and takeup reels are in the same plane mounted in a spaced apart position, it is possible to incorporate the same invention as would be apparent to those skilled in the art for the configurations to be made possible. For example, it is possible to use other differential pulley systems and alternate endless belt systems. The mono-directional clutch shown in the preferred embodiment is but one variety of clutch and the other varieties of equivalent clutches can be substituted.

From the foregoing it is apparent that the present invention provides an improved and greatly simplified tape transport drive in which a minimum number of parts are utilized while still performing all essential functions in a tape drive system. Such a system provides a relatively constant tension to be transferred from a supply reel to a takeup reel through the medium of a torque transferring means and preferably in the medium of a differential pulley system which transfers tension from one reel to the other by a resilient endless belt. The system also provides for a capstan motor drive which couples the motor shaft directly to the capstan and thereby eliminates needs for reduction drives and pinch rollers which have affected the total life of the tape transport and the reliability.

While only a single preferred embodiment is shown and described, it is to be appreciated that variations, changes, and rearrangements may be made without departing from the scope of the invention as defined in the appended claims.

I claim:

1. A tape transport comprising:
- a pair of reels, alternately serving as a supply reel and a takeup reel and having a tape extending between and coiled around each reel, the reels being spaced apart from each other and each having a rotating axis parallel to each other,
- a motor driven device being disposed between the two reels and engaging the tape and serving to pull tape from one of the reels,
- a first means for transmitting motion in a first direction and being coupled to each of the reels, and
- a second means for transmitting motion in a second direction and being coupled to each of the reels, whereby the motor driven device will draw tape from one of the reels and the rotation of that reel will rotate the means for transmitting motion from one of the reels and the rotation of that reel will rotate the second reel and thereby coil tape on the second reel.

2. A tape transport as defined in claim 1 and in addition:
- the first motion transmitting means includes a pair of differential pulleys coupled one each to the reels.

3. A tape transport as defined in claim 1 and in addition:
- the first motion transmitting means includes a pair of differential pulleys coupled one each to the reels, and
- the second motion transmitting means includes a pair of second differential pulleys being coupled respectively by a first clutch operable in a first direction and a second clutch operable in a second direction.

4. A tape transport for winding a tape comprising:
- a first and second reel rotatively mounted and being spaced apart from each other and each having an axis parallel to each other, one of the reels serving as a supply reel and the other reel serving as a pickup reel and the tape being coiled around both reels and extending therebetween,
- a means for driving the tape being in engagement with the tape,
- a first disc being secured to the first reel,
- a second disc being secured to the second reel,
- a means for transferring rotative motion from one reel to the other reel and being coupled to the first and second discs whereby the tape driving means will draw tape from one of the reels and the rotation of that reel will rotate the first disc and the motion transferring means will rotate the second disc on the second reel and thereby coil tape on the second reel after passing the tape driving means.

5. A tape transport as defined in claim 4 and in addition:
- the rotative motion transferring means is an endless elastic belt and the discs are pulleys that are frictionally engaged by the belt.

6. A tape transport as defined in claim 4 and in addition:
- the discs are in the form of pulleys with one pulley being larger than the other, and
- the rotative motion transferring means is an elastic endless belt.

7. A tape transport as defined in claim 4 and in addition:
- the tape driving means includes a motor having a shaft with a capstan thereon engaging the tape.

8. A tape transport as defined in claim 4 and in addition:
- the rotative motion transferring means includes a means for driving the first discs faster than the second disc to thereby place tension upon the two discs and the reels.

9. A tape transport comprising:
- a first and second reel rotatively mounted and being spaced apart from each other and each having an axis parallel to each other, one of the reels serving as a supply reel and the other reel serving as a pickup reel,
- a magnetic tape coiled on each of the reels and extending therebetween,
- a motor means including a shaft extending from the motor and a capstan being mounted upon the shaft, the capstan being engaged with the tape at a point betwen the two reels and the tape extending 180° around the capstan,
- a first shaft extending from the first reel,
- a second shaft extending from the second reel,
- a first pulley being mounted on the first shaft,
- a second pulley being fixedly mounted on the second shaft, the first pulley being larger in diameter than the second pulley,
- a third pulley being rotatively mounted on the second shaft and being spaced from the second pulley.

a fourth pulley being rotatively mounted on the first shaft and being spaced from the first pulley, the third pulley being larger in diameter than the fourth pulley, a first one-way clutch being mounted on the first shaft and being secured to the first pulley and the fourth pulley, and the clutch transmitting rotative power in a counterclockwise direction, a second one-way clutch being mounted on the second shaft and being secured to the second pulley and the third pulley and the clutch transmitting rotative power in a clockwise direction, a first endless elastic belt extending around the first and second pulleys and transmitting power between the first pulley and the second pulley and the rotation of the first larger pulley tending to make the smaller second pulley rotatate faster than the first pulley and thereby place tension on the second reel, a second endless elastic belt extending around the third and fourth pulleys and transmitting power between the third pulley to the fourth pulley and rotation of the third larger pulley tending to make the first smaller pulley rotate faster and thereby place tension on the first reel whereby upon operation of the motor driven capstan in a first direction, tape is pulled from one of the first reels, thereby rotating the first pulley and the first endless belt rotating the second pulley which in turn applies tension upon the second reel and coils the tape thereon, and rotation of the capstan in a second direction will pull tape from the second reel thereby rotating the second pulley and the second clutch driving the third pulley, the second belt rotating the fourth pulley which in turn is coupled to the first pulley and the first reel through the first clutch and thereby coils the tape on the first reel.

References Cited

UNITED STATES PATENTS

| | | | |
|---|---|---|---|
| 2,586,976 | 2/1952 | Millsap | 242—55.12 |
| 2,658,952 | 11/1953 | Harsant et al. | 242—55.12 X |
| 3,000,583 | 9/1961 | Hoskin | 242—55.12 |
| 3,002,703 | 10/1961 | Hinchman | 242—55.12 |

LEONARD D. CHRISTIAN, Primary Examiner

U.S. Cl. X.R.

74—218